(12) United States Patent
Mukainakano et al.

(10) Patent No.: US 10,077,015 B2
(45) Date of Patent: Sep. 18, 2018

(54) IMPACT ABSORBER (71) Applicant: Fuji Jukogyo Kabushiki Kaisha, Tokyo (JP)

(72) Inventors: Yuya Mukainakano, Tokyo (JP); Satoshi Ikeda, Tokyo (JP); Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 14/473,735

(22) Filed: Aug. 29, 2014

(65) Prior Publication Data
US 2015/0069773 A1 Mar. 12, 2015

(30) Foreign Application Priority Data
Sep. 10, 2013 (JP) .................................. 2013-186975

(51) Int. Cl.
*B60R 19/34* (2006.01)
*B60R 19/03* (2006.01)
(Continued)

(52) U.S. Cl.
CPC .............. *B60R 19/34* (2013.01); *B60R 19/03* (2013.01); *B60R 19/14* (2013.01); *B60R 2019/182* (2013.01)

(58) Field of Classification Search
CPC ......... B60R 19/03; B60R 19/04; B60R 19/14; B60R 19/18; B60R 19/26; B60R 19/34;
(Continued)

(56) References Cited

U.S. PATENT DOCUMENTS 2,135,749 A * 11/1938 Gullo ...................... B60R 19/36
267/135

3,313,567 A * 4/1967 Sturman ................. B60R 19/28
188/268
(Continued)

FOREIGN PATENT DOCUMENTS

CA 2818282 A1 5/2012
CN 101432168 A 5/2009
(Continued)

OTHER PUBLICATIONS

Chinese Office Action dated Sep. 28, 2016 in Chinese Patent Application No. 201410443288 (10 pages including machine translation).
(Continued)

*Primary Examiner* — Darrell G Dayoan
*Assistant Examiner* — Paul A Chenevert
(74) *Attorney, Agent, or Firm* — Smith, Gambrell & Russell, LLP (57) ABSTRACT

An impact absorber includes an energy absorbing member that is formed of a composite material and absorbs impact energy by crushing in a predetermined crush direction, an outer tube member surrounding the periphery of the energy absorbing member over the energy absorbing member along the crush direction to prevent foreign objects from entering or impacting the energy absorbing member, and a pressing member in contact with the front end of the energy absorbing member and the front end of the outer tube member to press the energy absorbing member and the outer tube member simultaneously in the crush direction to thereby crush them. The outer tube member formed in a shape in which tubular portions are coupled in the crush direction, and is crushed in the crush direction while the tubular portions are regularly folded when the outer tube member is pressed by the pressing member in the crush direction.

4 Claims, 7 Drawing Sheets

(51) Int. Cl.
*B60R 19/14* (2006.01)
*B60R 19/18* (2006.01)

(58) Field of Classification Search
CPC .... F16F 7/12; F16F 7/124; F16F 7/125; F16F 7/127; F16F 7/128
See application file for complete search history.

(56) References Cited

U.S. PATENT DOCUMENTS

| | | | | |
|---|---|---|---|---|
| 3,564,688 | A * | 2/1971 | DeGain | B60R 19/18 29/413 |
| 3,741,598 | A * | 6/1973 | Novak | B60R 19/20 267/116 |
| 3,743,266 | A * | 7/1973 | Sturman | B60R 19/28 267/162 |
| 3,759,351 | A * | 9/1973 | Purple | B60R 19/34 188/376 |
| 3,887,223 | A * | 6/1975 | Bez | B60R 19/34 188/371 |
| 4,170,380 | A * | 10/1979 | Raitport | B60N 2/4221 267/153 |
| 4,272,114 | A * | 6/1981 | Hirano | F16F 7/12 188/377 |
| 4,674,911 | A * | 6/1987 | Gertz | F16F 9/049 256/13.1 |
| 4,829,979 | A * | 5/1989 | Moir | B60R 19/34 188/377 |
| 4,901,486 | A * | 2/1990 | Kobori | E04B 1/98 188/377 |
| 5,116,092 | A * | 5/1992 | Schonleber | F16F 7/127 293/132 |
| 5,261,317 | A * | 11/1993 | Fraser, Jr. | F16J 3/047 92/34 |
| 5,264,259 | A * | 11/1993 | Satoh | B60R 19/34 114/219 |
| 5,875,875 | A * | 3/1999 | Knotts | B60R 19/34 188/268 |
| H001833 | H * | 2/2000 | Hoppel | B60N 2/4242 188/377 |
| 6,345,963 | B1 * | 2/2002 | Thomin | B64G 1/50 417/412 |
| 6,932,201 | B2 * | 8/2005 | Akiyama | B60R 19/22 188/371 |
| 7,632,586 | B2 * | 12/2009 | Ihringer | H01M 8/2425 429/413 |
| 7,842,378 | B2 * | 11/2010 | Harada | F16F 7/124 428/137 |
| 9,004,242 | B2 * | 4/2015 | Hodgson | F16F 7/12 188/266.7 |
| 9,051,984 | B2 | 6/2015 | Buron et al. | |
| 9,592,780 | B2 * | 3/2017 | Wendel | B60R 19/26 |
| 2004/0084820 | A1 * | 5/2004 | Kato | B60J 5/0444 267/141 |
| 2007/0114804 | A1 * | 5/2007 | Gross | B62D 21/152 293/132 |
| 2010/0032970 | A1 * | 2/2010 | Nishiguchi | B22D 17/00 293/132 |
| 2010/0287715 | A1 * | 11/2010 | Voyiadjis | F16F 7/12 14/76 |
| 2011/0226574 | A1 * | 9/2011 | Chen | B60R 19/34 188/377 |
| 2013/0300139 | A1 * | 11/2013 | Fukawatase | B60R 19/34 293/133 |
| 2014/0346789 | A1 * | 11/2014 | Okuda | F16F 7/12 293/122 |
| 2015/0069774 | A1 * | 3/2015 | Mukainakano | B60R 19/26 293/132 |
| 2015/0107005 | A1 * | 4/2015 | Schneider | A42B 3/065 2/414 |

FOREIGN PATENT DOCUMENTS

| | | | | |
|---|---|---|---|---|
| DE | 29914600 | U1 * | 11/1999 | F16F 7/125 |
| DE | 10140503 | A1 * | 3/2003 | B60R 19/34 |
| DE | 10238639 | A1 * | 3/2004 | B60R 19/34 |
| DE | 10343431 | A1 * | 4/2005 | F16F 7/124 |
| DE | 102004024578 | A1 * | 12/2005 | B62D 21/152 |
| DE | 102005026284 | B3 * | 11/2006 | F16F 7/125 |
| DE | EP 2085285 | A1 * | 8/2009 | B61G 11/16 |
| FR | 2785956 | A1 * | 5/2000 | F16F 7/127 |
| FR | 2797669 | A1 * | 2/2001 | B60R 13/02 |
| FR | 3009358 | A1 * | 2/2015 | F16F 7/124 |
| JP | 3456596 | | 10/2003 | |
| JP | WO 2013164931 | A1 * | 11/2013 | B60R 19/34 |
| JP | WO 2015015747 | A1 * | 2/2015 | B61D 15/06 |
| JP | WO 2015092832 | A1 * | 6/2015 | B61D 15/06 |
| WO | WO 0218816 | A1 * | 3/2002 | F16F 7/12 |
| WO | 2006/029119 | A2 | 3/2006 | |
| WO | WO 2010078988 | A2 * | 7/2010 | B60R 19/32 |

OTHER PUBLICATIONS

Chinese Office Action dated Jan. 20, 2017 in Chinese Patent Application No. 201410443288 (5 pages).
Chinese Office Action dated Jan. 20, 2017 in Chinese Patent Application No. 201410443288 (5 pages, plus English translation).

* cited by examiner

-- Prior Art --

IMPACT ABSORBER

CROSS-REFERENCE TO RELATED APPLICATIONS

The present application claims priority from Japanese Patent Application No. 2013-186975 filed on Sep. 10, 2013, the entire contents of which are hereby incorporated by reference.

BACKGROUND

1. Technical Field

The present invention relates to an impact absorber that absorbs an impact at the time of a collision or the like, and relates to an impact absorber suitably used in, e.g., an automobile.

2. Related Art

An impact absorber that is mounted on, e.g., an automobile and absorbs an impact from the outside is conventionally known. In the impact absorber, an energy absorbing member formed in, e.g., a tubular shape receives an impact load and is longitudinally crushed, whereby the energy absorbing member absorbs the impact load (impact energy). Conventionally, an energy absorbing member made of a metal (e.g., aluminum alloy) has been used. However, in recent years, an energy absorbing member made of a composite material (e.g., fiber reinforced plastic) that has higher energy absorption performance and is lighter is developed and is becoming commercially available.

In such an impact absorber, when the energy absorbing member is exposed to the outside, in the case where a foreign object from the outside (e.g., a small stone) impacts against the impact absorbing member, there is a possibility that the energy absorbing member is crushed due to an unintended destruction form such as local interlayer delamination or the like and desired energy absorption performance cannot be delivered. In addition, there are cases where a foreign object from the outside enters into a space between the energy absorbing member and a pressing member that presses and crushes the energy absorbing member. When the pressing member presses the energy absorbing member with the foreign object interposed between the pressing member and the energy absorbing member, there is a possibility that the energy absorbing member made of the composite material is crushed due to the unintended destruction form such as the local interlayer delamination that starts from a portion pressed by the foreign object, and the desired energy absorption performance cannot be delivered.

Figure 6:
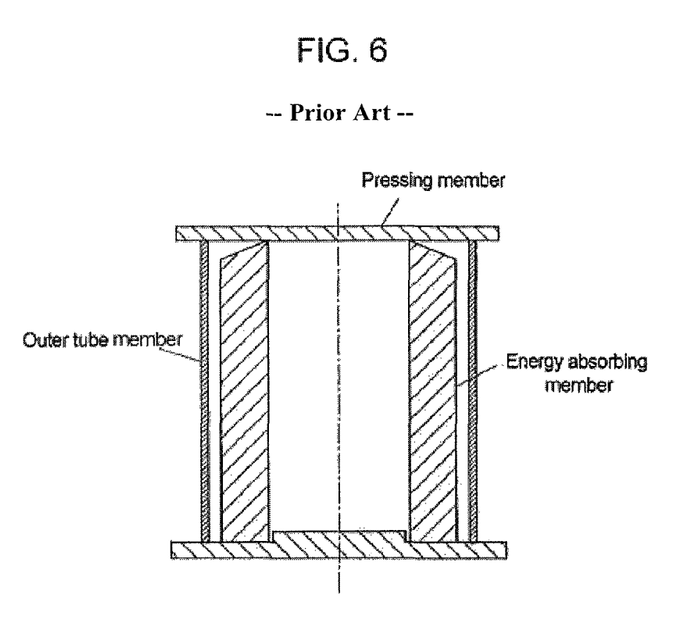
FIG. 6 is a cross-sectional view of a conventional impact absorber (prior art)

The impact by the foreign object from the outside or the entry thereof can be prevented by providing an outer tube member that surrounds the periphery of the energy absorbing member, as illustrated in FIG. 6 (e.g., see Japanese Patent No. 3456596). In this case, the outer tube member is formed of, e.g., a thin metal, and is pressed and crushed together with the energy absorbing material by the pressing member.

Figure 7A:
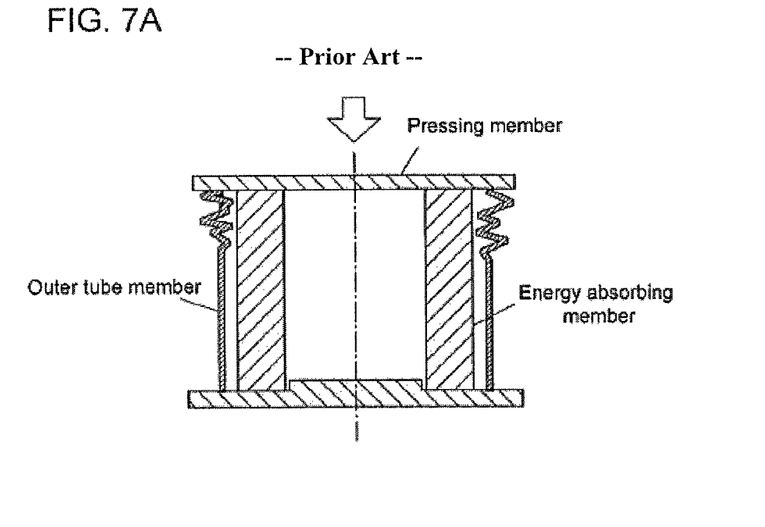
Figure 7B:
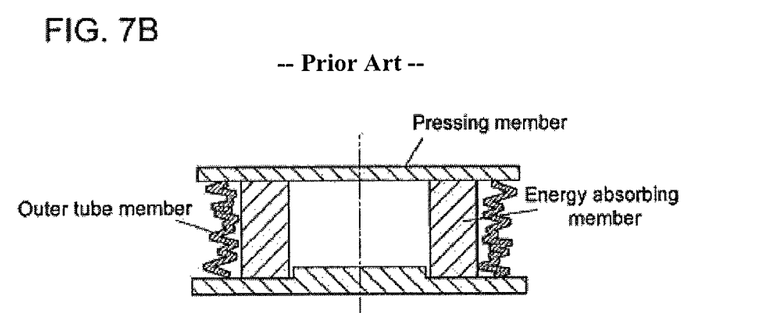

However, as illustrated in FIG. 7A, the outer tube member formed in a simple tubular shape is crushed while causing buckling at irregular positions as if an aluminum can is longitudinally crushed. Consequently, as illustrated in FIG. 7B, the outer tube member is completely crushed in a state in which its longitudinal height is relatively high, and the completely crushed outer tube member functions as a strut and supports the impact load. As a result, the completely crushed outer tube member inhibits the crush of the energy absorbing member in spite of the remaining portion of the energy absorbing member to be crushed (i.e., remaining energy to be absorbed), and hence the total energy absorption amount of the entire energy absorbing member is reduced.

SUMMARY OF THE INVENTION

The present invention has been achieved in view of the above problem, and an object thereof is to provide the impact absorber capable of increasing the total energy absorption amount as compared with the conventional case while preventing the impact by the foreign object from the outside or the entry thereof.

In order to achieve the above object, a first aspect of the present invention provides an impact absorber including an energy absorbing member that is formed of a composite material and absorbs impact energy by being crushed in a predetermined crush direction, an outer tube member disposed so as to surround a periphery of the energy absorbing material over an entire length of the energy absorbing member along the crush direction, and a pressing member that is disposed so as to be in contact with an end of the energy absorbing member and an end of the outer tube member in the crush direction, and presses the energy absorbing member and the outer tube member simultaneously in the crush direction to thereby crush the energy absorbing member and the outer tube member. In the impact absorber, the outer tube member is formed in a shape in which a plurality of tubular portions are coupled in the crush direction, and is crushed in the crush direction while the tubular portions are regularly folded when the outer tube member is pressed by the pressing member in the crush direction.

The outer tube member may be formed in a shape in which the plurality of tubular portions having mutually different diameters are coupled such that the tubular portions are telescopically retracted in the crush direction when the outer tube member is pressed in the crush direction.

The outer tube member may be formed in a bellows-like shape having a central axis along the crush direction.

The composite material may be a carbon fiber reinforced plastic.

BRIEF DESCRIPTION OF THE DRAWINGS

FIGS. 3(3A, 3B and 3C) is a view for explaining the state of energy absorption of the impact absorber in the first implementation;

FIGS. 5(5A, 5B, and 5C) is a view for explaining the state of energy absorption of the impact absorber in the second implementation;

FIGS. 7 (7A and 7B) is a view for explaining the state of energy absorption of the conventional impact absorber (prior art).

DETAILED DESCRIPTION

Hereinbelow, implementations of the present invention will be described with reference to the drawings.

[First Implementation]

First, a first implementation of the present invention will be described.

Figure 1:
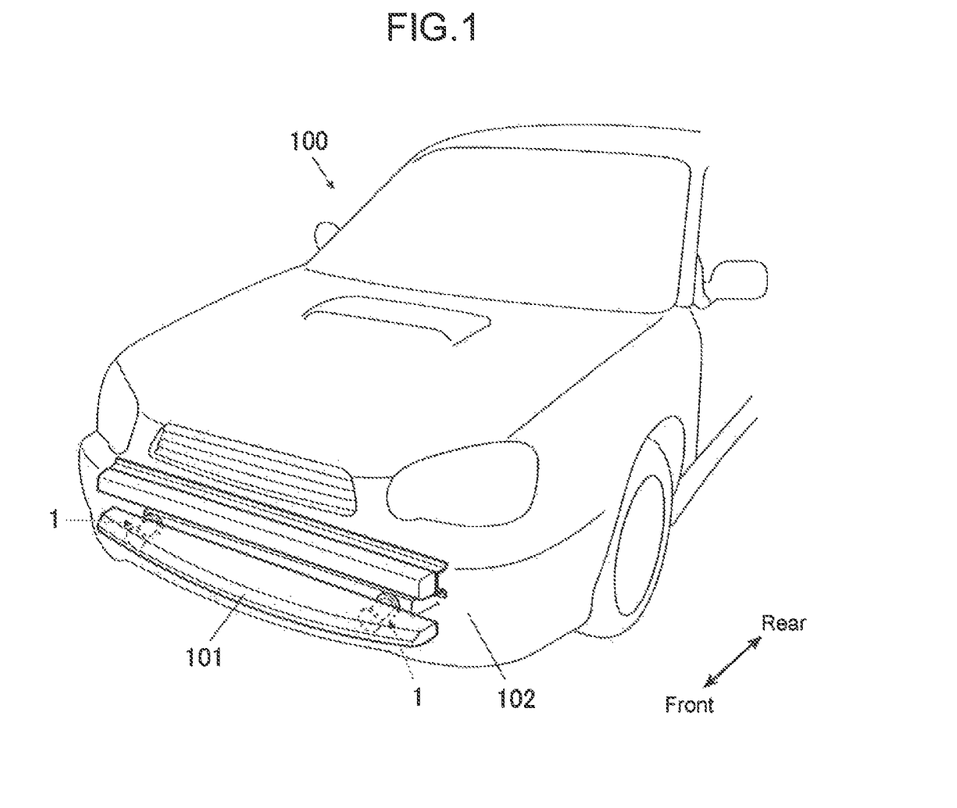
FIG. 1 is a perspective view of a vehicle on which an impact absorber in a first implementation is mounted.
Figure 2:
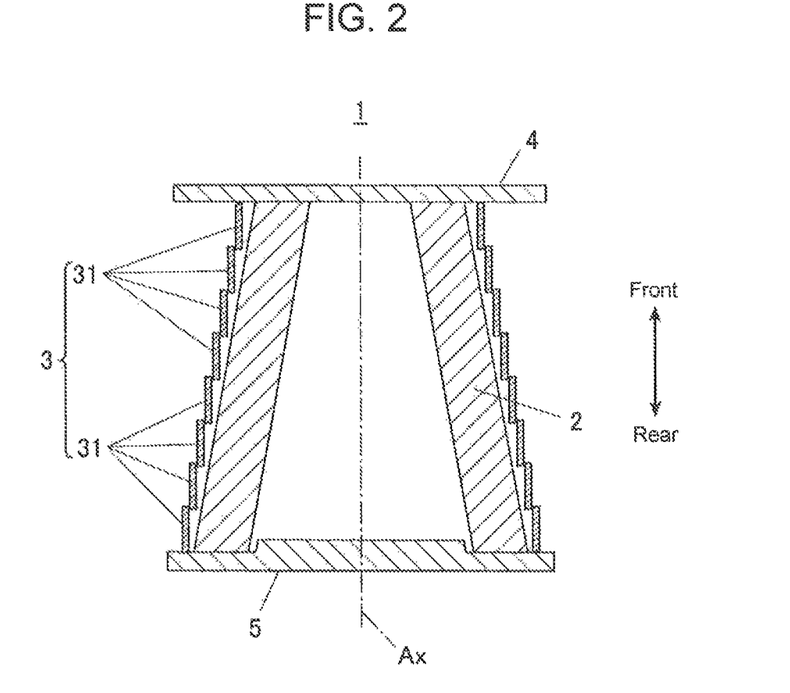
FIG. 2 is a cross-sectional view of the impact absorber in the first implementation.

FIG. 1 is a perspective view of a vehicle 100 on which an impact absorber 1 in the first implementation is mounted, and FIG. 2 is a cross-sectional view of the impact absorber 1.

As illustrated in FIG. 1, two impact absorbers 1 are disposed side by side between a bumper beam 101 and a body frame 102 of the vehicle (automobile) 100, and absorb an impact from the front of the vehicle.

Note that, in the following description, the description of "front" and "rear" means directions as viewed from the vehicle 100 on which the impact absorber 1 is mounted unless otherwise specified.

Specifically, as illustrated in FIG. 2, the impact absorber 1 includes a crush box 2, an outer tube member 3 that surrounds the periphery of the crush box 2, a pressing member 4 that presses the crush box 2, and a supporting member 5 that supports the crush box 2.

Among them, the crush box 2 is an energy absorbing member according to the present invention, and is formed of fiber reinforced plastics (FRP) as a composite material obtained by reinforcing a resin with a fiber. The type of the fiber includes carbon fiber, glass fiber, basalt fiber, and aramid fiber, and it is preferable to use the carbon fiber excellent in energy absorption amount and strength. The crush box 2 is formed in a hollow circular truncated cone shape having a substantially uniform thickness with a central axis Ax along a front-rear direction serving as a rotational symmetry axis, and is disposed such that its diameter is reduced toward the front. The crush box 2 absorbs impact energy by being pressed from the front by the pressing member 4 having received an impact load and crushed in the front-rear direction. Note that the front end surface of the crush box 2 that is pressed by the pressing member 4 at the initial stage of pressing can be formed in a shape corresponding to a desired crush form of the crush box 2, and may be formed in a tapered shape though not illustrated in the drawing.

The outer tube member 3 is used to prevent a direct collision of a foreign object from the outside with the crush box 2 or entry of the foreign object from the outside into a space between the crush box 2 and the pressing member 4, and is formed of a metal such as, e.g., an aluminum alloy or the like. The outer tube member 3 is formed in a rotationally symmetrical shape having a central axis matching the central axis Ax of the crush box 2, and is disposed so as to surround the periphery of the crush box 2 over the entire length of the crush body 2 along the front-rear direction. More specifically, the outer tube member 3 is formed in a shape formed by coupling, in the front-rear direction, tubular portions 31, . . . that are sufficiently shorter than the crush box 2 in the front-rear direction. The tubular portions 31, . . . have substantially the same length along the front-rear direction, and each tubular portion 31 is formed in a cylindrical shape having a diameter smaller than that of the subsequent tubular portion 31 in a rear direction. The outer tube member 3 is formed in a shape having a diameter gradually increased toward the rear by coupling the front end portions and the rear end portions of the tubular portions 31, . . . . With the configuration described above, as will be described later, when the outer tube member 3 is pressed from the front along the front-rear direction, the outer tube member 3 is regularly crushed while each tubular portion 31 is retracted to the inside of the subsequent tubular portion 31 in the rear direction, i.e., the tubular portions 31, . . . are retracted so-called telescopically.

The outer tube member 3 may not be configured such that the tubular portions 31, . . . are telescopically retracted as long as the outer tube member 3 is configured to be crushed in the front-rear direction while the tubular portions 31, . . . are regularly folded when the outer tube member 3 is pressed from the front along the front-rear direction.

In addition, the outer tube member 3 may be formed by coupling the tubular portions 31, . . . by welding or the like, or may also be formed integrally with the tubular portions 31, . . . .

The pressing member 4 is used to press and crush the crush box 2 and the outer tube member 3, is formed in a substantially flat shape orthogonal to the front-rear direction, and is disposed so as to be in contact with the front ends of the crush box 2 and the outer tube member 3 over the entire circumferences thereof. In addition, the pressing member 4 also serves as the attachment portion of the impact absorber 1 to the vehicle 100, and is attached to the bumper beam 101 such that its front surface is in contact with the rear surface of the bumper beam 101 of the vehicle 100 (see FIG. 1). Accordingly, as will be described later, the pressing member 4 receives the impact load applied from the front via the bumper beam 101, and simultaneously presses the crush box 2 and the outer tube member 3 from the front along the front-rear direction and crushes them. Note that an example of a method for fixing the crush box 2 to the bumper beam 101 includes a method in which a contact pressure is caused between the crush box 2 and the pressing member 4 by binding the pressing member 4 and the supporting member 5 together using a bolt and the crush box 2 is thereby fixed to the bumper beam 101.

The supporting member 5 is used to support the crush box 2 and the outer tube member 3, is formed in a substantially flat shape orthogonal to the front-rear direction, and is disposed so as to be in contact with the rear ends of the crush box 2 and the outer tube member 3 over the entire circumferences thereof. In addition, the supporting member 5 also serves as the attachment portion of the impact absorber 1 to the vehicle 100, and is attached to the body frame 102 such that its rear surface is in contact with the front surface of the body frame 102 of the vehicle 100 (see FIG. 1).

Subsequently, the state of energy absorption when the impact absorber 1 receives the impact load from the outside will be described with reference to FIG. 3.

Figure 3A:
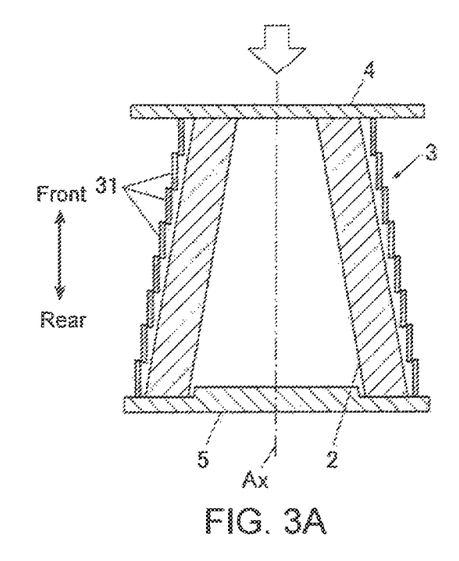
Figure 3B:
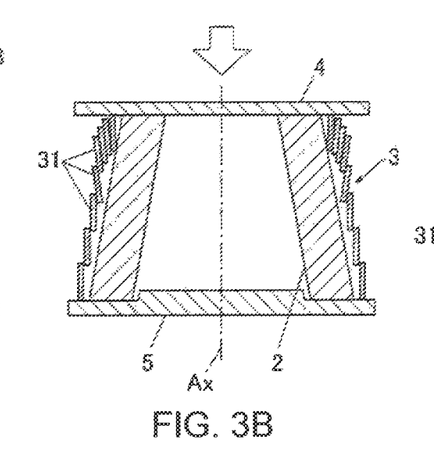
Figure 3C:
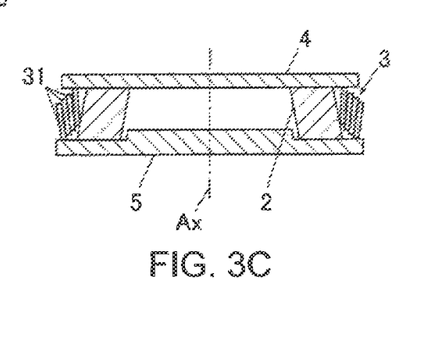

FIG. 3 is a view for explaining the state of the energy absorption of the impact absorber 1.

First, when the vehicle 100 on which the impact absorber 1 is mounted collides with an object in front, as illustrated in FIG. 3A, the impact load from the front is applied to the pressing member 4 via the bumper beam 101.

Subsequently, as illustrated in FIG. 3B, the pressing member 4 having received the impact load simultaneously presses the crush box 2 and the outer tube member 3 from the front along the front-rear direction to thereby crush the crush box 2 and the outer tube member 3.

At this point, though not illustrated in the drawing, a fiber of a portion of the crush box 2 directly pressed by the pressing member 4 is ruptured, and the crush box 2 is gradually crushed while most rupture pieces are dragged into an inner peripheral side. Subsequently, the impact energy is absorbed with the crush of the crush box 2, and the impact load is cushioned.

On the other hand, the outer tube member 3 is crushed in the front-rear direction while the tubular portions 31, . . . are regularly folded. More specifically, the outer tube member 3 is regularly crushed while each of the tubular portions 31, . . . is retracted to the inside of the subsequent tubular portion 31 in the rear direction sequentially from the front stepwise, i.e., the tubular portions 31, . . . are retracted so-called telescopically.

In addition, at this point, the outer tube member 3 holds the rupture pieces of the crush box 2 that tend to spread to the outer peripheral side and, by extension, prevents the crush box 2 from being ruptured to the outer peripheral side. Consequently, it is possible to facilitate the rupture of the crush box 2 to the inner peripheral side and increase a crush load (load required for the crush) of the crush box 2.

The crush box 2 and the outer tube member 3 are gradually crushed from the front side and, as illustrated in FIG. 3C, are crushed until the outer tube member 3 is completely crushed and the crush loads of the crush box 2 and the outer tube member 3 become equal to the impact load. At this point, though depending on the magnitude of the impact load, the outer tube member 3 is crushed so as to be regularly folded, and the length of the outer tube member 3 in the longitudinal direction (the front-rear direction) is thereby reduced to be close to that of one tubular portion 31.

As described thus far, according to the impact absorber 1 of the first implementation, since the outer tube member 3 disposed so as to surround the periphery of the crush box 2 is provided, it is possible to prevent the impact by the foreign object from the outside or the entry thereof using the outer tube member 3.

In addition, since the outer tube member 3 is formed in the shape formed by coupling the cylindrical portions 31, . . . in the front-rear direction and the outer tube member 3 is crushed in the front-rear direction while the tubular portions 31, . . . are regularly folded when the outer tube member 3 is pressed by the pressing member 4 in the front-rear direction, it is possible to easily crush the outer tube member 3 until the length of the outer tube member 3 in the longitudinal direction (the front-rear direction) becomes short as compared with the conventional case where the outer tube member is formed in the simple tubular shape. With this, it is possible to crush the crush box 2 until the length of the crush box 2 becomes shorter than in the conventional case and, by extension, it is possible to increase the total energy absorption amount of the crush box 2.

Consequently, it is possible to increase the total energy absorption amount as compared with the conventional case while preventing the impact by the foreign object from the outside or the entry thereof.

In addition, since the outer tube member 3 holds the rupture pieces of the crush box 2 that tend to spread to the outer peripheral side and, by extension, prevents the crush box 2 from being ruptured to the outer peripheral side, it is possible to facilitate the rupture of the crush box 2 to the inner peripheral side and increase the crush load of the crush box 2.

[Second Implementation]

Next, a second implementation of the present invention will be described. Note that the same components as those of the first implementation are designated by the same reference numerals and the description thereof will be omitted.

Figure 4:
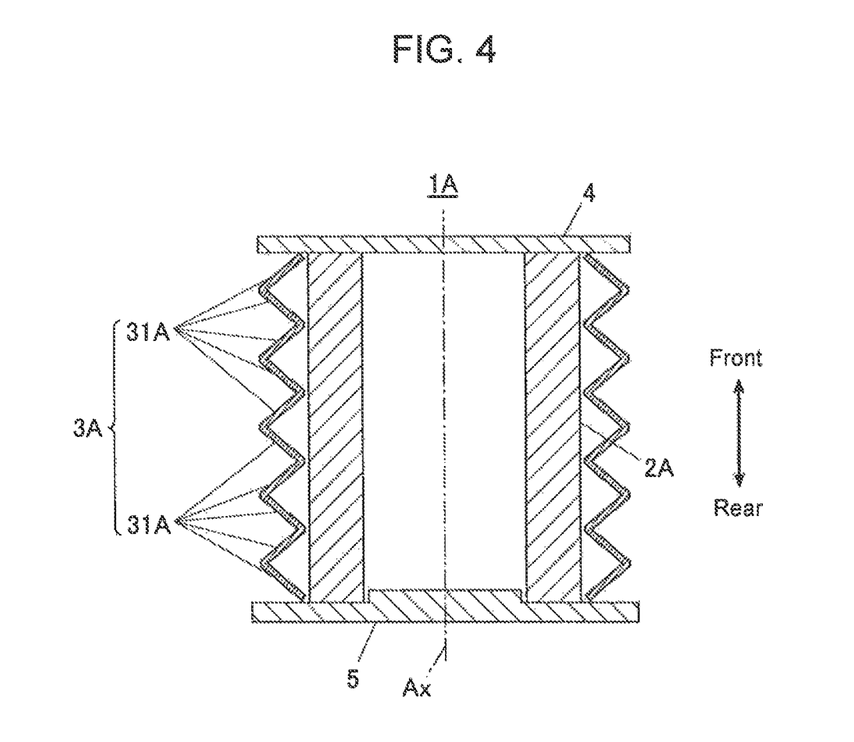
FIG. 4 is a cross-sectional view of an impact absorber in a second implementation.

FIG. 4 is a cross-sectional view of an impact absorber 1A in the second implementation.

As illustrated in the drawing, the impact absorber 1A includes a crush box 2A and an outer tube member 3A instead of the crush box 2 and the outer tube member 3 in the first implementation.

Among them, the crush box 2A is formed in a cylindrical shape having the central axis Ax along the front-rear direction. The configuration of the crush box 2A is otherwise the same as that of the crush box 2 in the first implementation.

On the other hand, similarly to the outer tube member 3 in the first implementation, the outer tube member 3A is formed in the rotationally symmetrical shape having the central axis matching the central axis Ax of the crush box 2A, and is disposed so as to surround the periphery of the crush box 2A over the entire length of the crush box 2A along the front-rear direction. The outer tube member 3A is formed in a bellows-like shape formed by coupling tubular portions 31A, . . . each in a hollow circular truncated cone shape in the front-rear direction. More specifically, the outer tube member 3A is formed in the bellows-like shape by alternately coupling the tubular portion 31A that is narrowed toward the front and the tubular portion 31A that is narrowed toward the rear in the front-rear direction. The configuration of the outer tube member 3A is otherwise the same as that of the outer tube member 3 in the first implementation.

Next, the state of the energy absorption when the impact absorber 1A receives the impact load from the outside will be described with reference to FIG. 5.

Figure 5A:
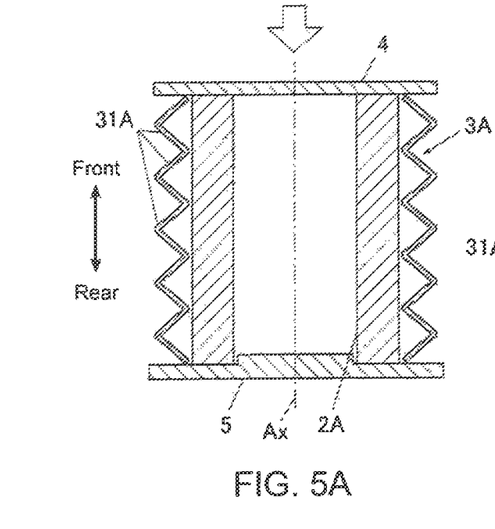
Figures 5B, 5C:
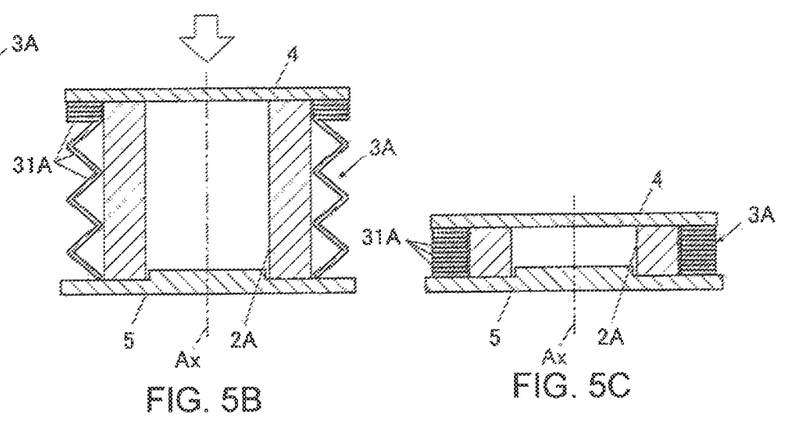

FIG. 5 is a view for explaining the state of the energy absorption of the impact absorber 1A.

First, when the vehicle 100 on which the impact absorber 1A is mounted collides with an object in front, as illustrated in FIG. 5A, the impact load from the front is applied to the pressing member 4 via the bumper beam 101.

Subsequently, as illustrated in FIG. 5B, the pressing member 4 having received the impact load simultaneously presses the crush box 2A and the outer tube member 3A from the front along the front-rear direction to thereby crush the crush box 2A and the outer tube member 3A.

At this point, though not illustrated in the drawing, similarly to the crush box 2 in the first implementation, the fiber of the portion of the crush box 2A directly pressed by the pressing member 4 is ruptured, and the crush box 2A is gradually crushed while most rupture pieces are dragged into the inner peripheral side.

On the other hand, the outer tube member 3A is crushed in the front-rear direction while the tubular portions 31A, . . . are regularly folded. More specifically, the outer tube member 3A is regularly crushed while each of the tubular portions 31A, . . . is flattened sequentially from the front so as to be orthogonal to the front-rear direction, and is brought into contact (surface contact) with the subsequent tubular portion 31A in the rear direction.

Subsequently, the crush box 2A and the outer tube member 3A are gradually crushed from the front side and, as illustrated in FIG. 5C, are crushed until the outer tube member 3A is completely crushed and the crush loads of the crush box 2A and the outer tube member 3A become equal to the impact load. At this point, though depending on the magnitude of the impact load, the outer tube member 3A is crushed so as to be regularly folded, and the outer tube member 3A is thereby crushed to be shortened until all of the tubular portions 31A, . . . are flattened (crushed) so as to be orthogonal to the front-rear direction.

According to the impact absorber 1A of the second implementation as well, it is possible to obtain the same effects as those of the impact absorber 1 of the first implementation.

[Modification]

Note that the implementation to which the present invention can be applied is not limited to the first and second implementations described above, and the implementation can be appropriately changed without departing from the gist of the present invention.

For example, the shape of the crush box 2 (2A) is not limited to the circular truncated cone shape or the cylindrical shape, and may be, e.g., a cylindrical column shape, a prism shape, or a pyramid shape.

In addition, the impact absorber according to the present invention is not limited to the impact absorber mounted on the vehicle (automobile), and can be suitably used as, e.g., the impact absorber that is mounted on a helicopter and absorbs the impact during landing.

The invention claimed is:

1. An impact absorber comprising:
   an energy absorbing member that is formed of a composite material and absorbs impact energy by being crushed in a predetermined crush direction;
   an outer tube member disposed so as to surround a periphery of the energy absorbing member over an entire length of the energy absorbing member along the crush direction; and
   a pressing member disposed so as to be in contact with a front end of the energy absorbing member and a front end of the outer tube member in the crush direction, and for pressing the energy absorbing member and the outer tube member simultaneously in the crush direction to thereby crush the energy absorbing member and the outer tube member,
   wherein the energy absorbing member is formed in a tapered shape having a larger width at a first end and a smaller width at a second end, and the outer tube member is formed in a shape in which a plurality of tubular portions are coupled in the crush direction with at least one tubular portion having a smaller width than the width of the first end of the energy absorbing member, and
   wherein the outer tube member is crushed in the crush direction by telescopically retracting the tubular portions, with a first tubular portion retracting to the inside of a second tubular portion, when the outer tube member is pressed in the crush direction by the pressing member.

2. The impact absorber according to claim 1, wherein the composite material is a carbon fiber reinforced plastic.

3. The impact absorber according to claim 1, wherein the outer tube member is formed in a shape in which the plurality of tubular portions have mutually different diameters.

4. The impact absorber according to claim 3, wherein the composite material is a carbon fiber reinforced plastic.

* * * * *